United States Patent
Callaghan et al.

(10) Patent No.: US 9,524,570 B1
(45) Date of Patent: Dec. 20, 2016

(54) VISUALIZING REAL TIME PRODUCTION STATUS

(71) Applicant: The Boeing Company, Seal Beach, CA (US)

(72) Inventors: Michael L. Callaghan, Everett, WA (US); Burke R. Magee, II, Carnation, WA (US)

(73) Assignee: The Boeing Company, Chicago, IL (US)

( * ) Notice: Subject to any disclaimer, the term of this patent is extended or adjusted under 35 U.S.C. 154(b) by 282 days.

(21) Appl. No.: 14/034,131

(22) Filed: Sep. 23, 2013

(51) Int. Cl.
*G06T 1/20* (2006.01)
*G06T 11/20* (2006.01)
*G09G 5/00* (2006.01)

(52) U.S. Cl.
CPC ............. *G06T 11/206* (2013.01); *G09G 5/006* (2013.01)

(58) Field of Classification Search
CPC ............................ G06T 11/206; G09G 5/006
USPC ......................................................... 345/440
See application file for complete search history.

(56) References Cited

U.S. PATENT DOCUMENTS

| | | |
|---|---|---|
| 6,999,081 B1 | 2/2006 | Lin et al. |
| 7,445,834 B2 | 11/2008 | Morin |
| 7,558,638 B2 | 7/2009 | Chang et al. |
| 7,660,645 B2 | 2/2010 | Izumi et al. |
| 7,937,175 B2 | 5/2011 | de Kleer et al. |
| 8,406,912 B2 | 3/2013 | Chen et al. |
| 8,427,670 B2 | 4/2013 | Rai |
| 8,515,793 B2 | 8/2013 | Chen et al. |
| 2003/0150908 A1* | 8/2003 | Pokorny et al. ............. 235/375 |
| 2004/0100467 A1* | 5/2004 | Heaton ........................ 345/440 |
| 2006/0212324 A1* | 9/2006 | Okman et al. .................... 705/7 |
| 2007/0067233 A1* | 3/2007 | Dalal ............................ 705/37 |
| 2009/0138315 A1* | 5/2009 | Schroeder ....................... 705/8 |

* cited by examiner

*Primary Examiner* — Ke Xiao
*Assistant Examiner* — Kim-Thanh T Tran
(74) *Attorney, Agent, or Firm* — Perman & Green LLP

(57) ABSTRACT

A production system includes a processor, a non-transitory computer readable medium including computer program code instructions, and a user interface. The user interface and the processor, under control of the computer program code are configured to visually display at least a first graphical representation of a first work measure attribute and a second graphical representation of a second related work measure attribute for a production operation over a time range, and visually display a variance between trends of the at least first and second graphical representations of the first and second work measure attributes over the time range.

34 Claims, 7 Drawing Sheets

FIRST-SECOND SHIFT

NET AVAILABLE TIME

- NO. OF SHIFTS: 2 — 305
- HRS. PER SHIFT: 8.5 — 310
- AVAIL. TIME PER SHIFT: 510 — 330
- BREAKS: 20 — 315
- LUNCH: 30 — 320
- TIME NOT ON PRODUCTION: 45 — 325
- NET AVAIL. TIME/MIN: 415 — 335
- NET AVAIL. TIME/SEC: 24900 — 340
- NET AVAIL. TIME*SHIFTS: 49800 — 345

DAILY DEMAND

- FULL DEMAND: 5081 — 350
- DAILY DEMAND: 4598 — 355
- NET AVAIL. TIME: 49800 — 360
- DAILY DEMAND: 4598 — 365
- TAKT TIME: 11 — 370

VISUALIZING REAL TIME PRODUCTION STATUS

BACKGROUND

1. Field

The exemplary embodiments generally relate to production systems and, more particularly, to providing an improved view of the operations and processes of production systems.

2. Brief Description of Related Developments

Production system data may be in forms that are hard to comprehend and may not be timely enough to provide an understanding of production factors that could be modified to improve the production system.

It would be advantageous to provide a suite of visual tools that display production system data for production operations and processes in order to understand the status of a production system at any given time, and in order to identify and make adjustments to operations and processes that are causing a negative impact on production system performance.

BRIEF DESCRIPTION OF THE DRAWINGS

The foregoing aspects and other features of the disclosed embodiments are explained in the following description, taken in connection with the accompanying drawings, wherein:

FIG. 3 is an exemplary display for entering parameters and displaying a resulting calculated planned takt time in accordance with aspects of the disclosed embodiment;

DETAILED DESCRIPTION

Figure 1:
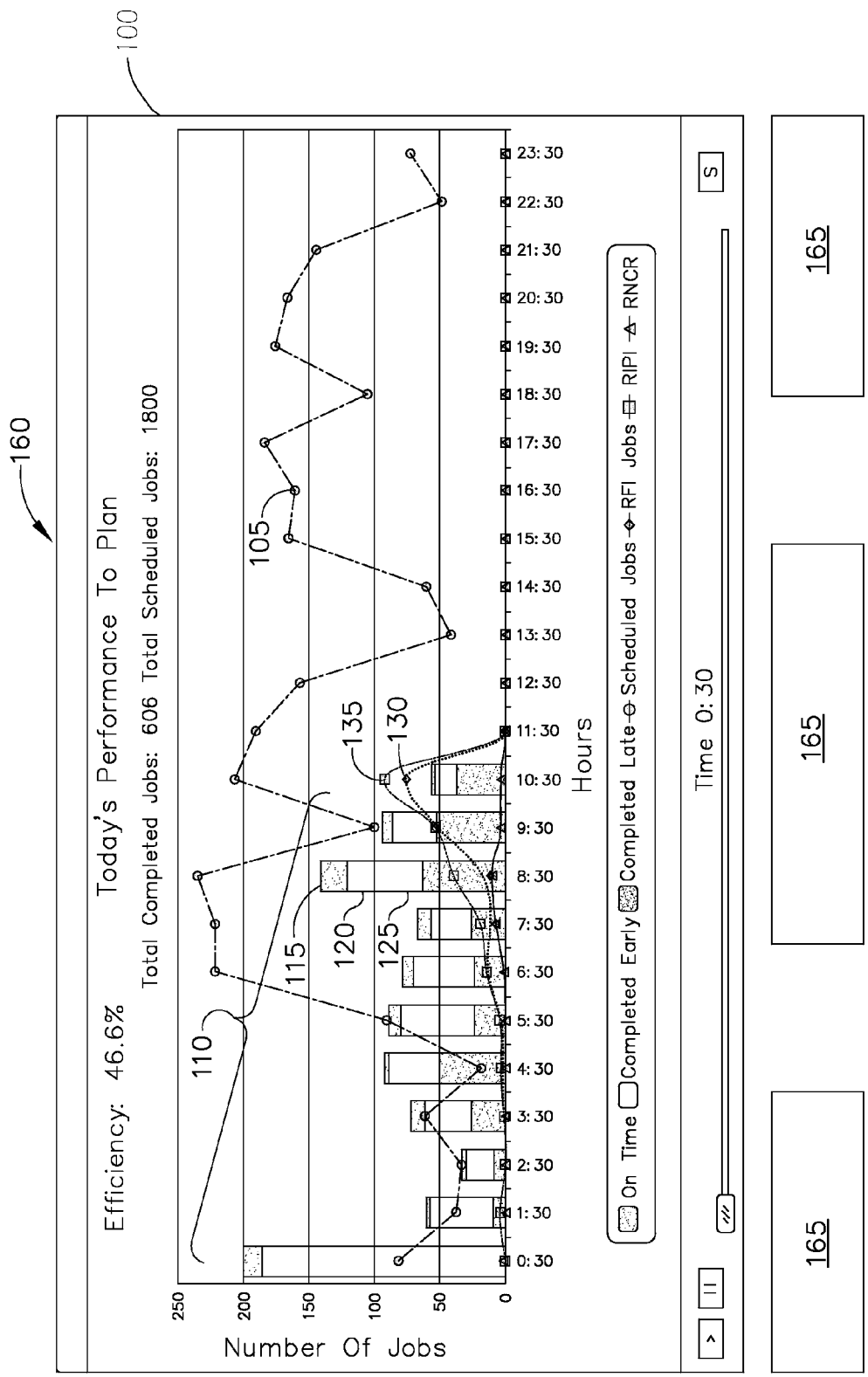
FIG. 1 is a schematic illustration of a visual display in accordance with aspects of the disclosed embodiment.

FIG. 1 illustrates a visual display in accordance with an aspect of the disclosed embodiment. Although the aspects of the disclosed embodiment will be described with reference to the drawings, it should be understood that the aspects of the disclosed embodiment can be embodied in many forms. In addition, any suitable size, shape or type of elements or materials could be used.

The disclosed embodiment includes a suite of visualization tools that display production system data. The suit of visualization tools provides insight into significant production factors that may be altered to improve production operations or processes and as a result, the overall production system. For example, production factors that cause one piece flow operations to become batch and queue operations may be identified and corrected. Previously, the ability to recognize these production factors and to effectively manage a production system and one or more production operations or processes might require years of experience in a specific production environment in order to develop the necessary depth of knowledge.

The disclosed embodiment provides a suite of production and quality inspection attributes that are monitored in real-time, together with an at-a-glance graphical representation designed to convey the production system status.

In one aspect, real time may refer generally to a time period in which an event or trend is recognized and able to be acted upon in order to influence the next data point.

Figure 6:
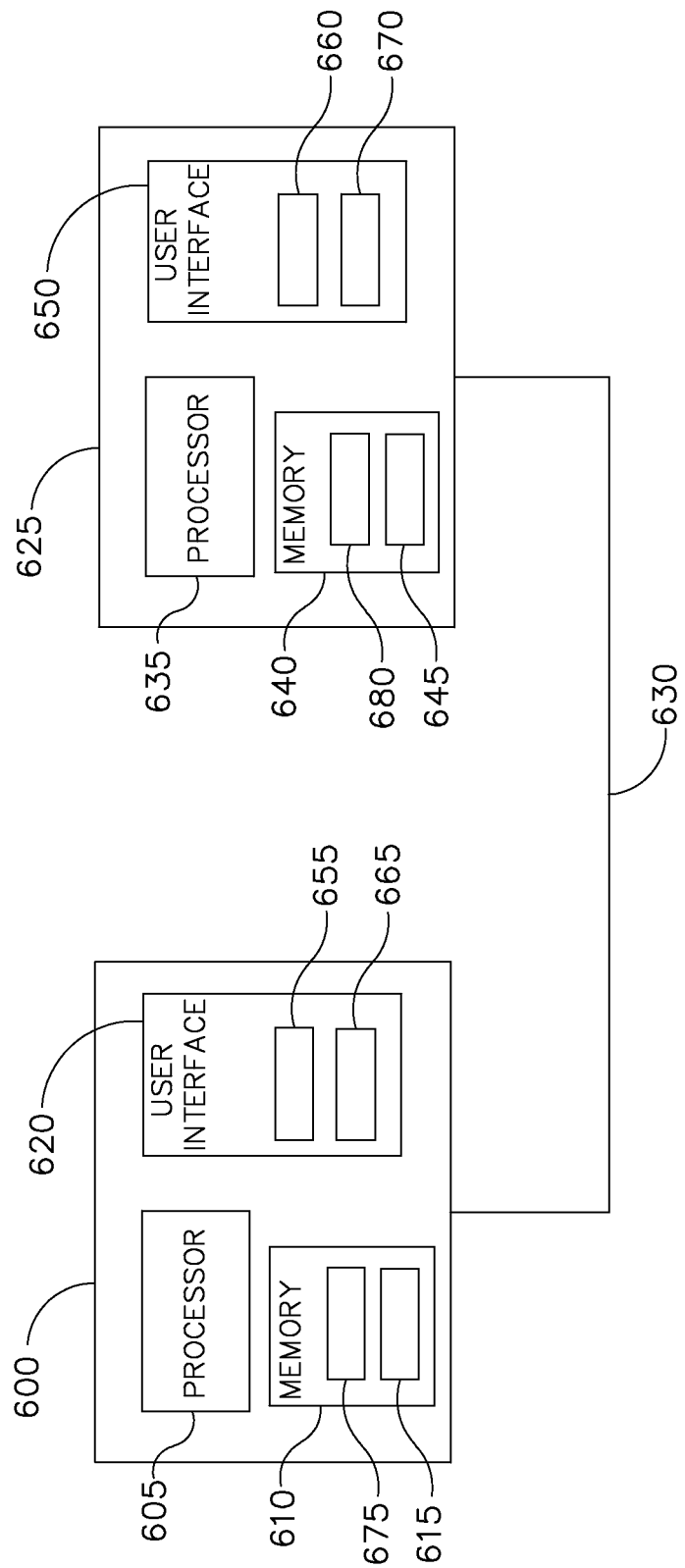
FIG. 6 shows an exemplary computer system in accordance with aspects of the disclosed embodiment.

In one or more exemplary aspects of the disclosed embodiment, a production system may include one or more production operations and one or more production processes providing services or components to the one or more production operations. The production system of the disclosed embodiment may be implemented utilizing a computer system as shown in FIG. 6 and described below.

In at least one aspect of the disclosed embodiment, a job may refer to a task, an activity, a unit to be completed, or any other appropriate measure of work.

It should be understood that a production system may include one or more production operations and one or more production processes providing services or components to the one or more production operations. In at least one exemplary aspect, a production system may include a hierarchy of levels including a program level, business unit level, shop level, and a crew level.

FIG. 1 shows a visual display 100 from the suite of visualization tools 160 that display production system data. Visual display 100 may be one of a number of displays of the suite that may include additional displays or sources of data 165. The visual display 100 depicts performance data for a production system, in particular, a number of graphical representations of exemplary related work measure attributes. The graphical representations of related work measure attributes in FIG. 1 are displayed over a range of units of measure. In this example, the units of measure are shown as increments of time, however any units of measure suitable for measuring aspects of a production system may be used. The work measure attributes may include a number of scheduled jobs represented by a line graph 105, and a number of completed jobs represented by bar graphs 110. In this example, bar graphs 110 include stacked sections representing a number of jobs completed on time 115, jobs completed early 120, and jobs completed late 125. Other exemplary related work measure attributes may include requests for inspection, requests for in process inspection and requests for non-conformance records, represented by line graphs 130, 135, and 140, respectively.

The illustrated related work measure attributes are not limited to the examples disclosed but may include any attribute that may be used to measure any work characteristic. Furthermore, while the exemplary work measure attributes are represented by line and bar graphs, the work measure attributes may be represented by any graphical illustration, including but not limited to pictographs, pie charts, dot plots, or histograms.

The visual display 100 may provide a view of a variance between trends of the graphical representations of the related work measure attributes. For example, in the first six time increments (0:30-5:30) of the visual display 100, the number of completed jobs represented by bar graphs 110, generally equal or exceed the number of scheduled jobs represented by line graph 105. As another example, in the $7^{th}$ through $11^{th}$ time increments (6:30-10:30), the number of scheduled jobs represented by line graph 105 exceeds a number of completed jobs represented by bar graphs 110. By observing the visual display 100, variances among the trends of any of the work measure attributes may be identified. The representations of work measure attributes may be selectively displayed, individually or in groups, in order to more easily perceive variances among the trends of the work measure attributes.

Figure 2:
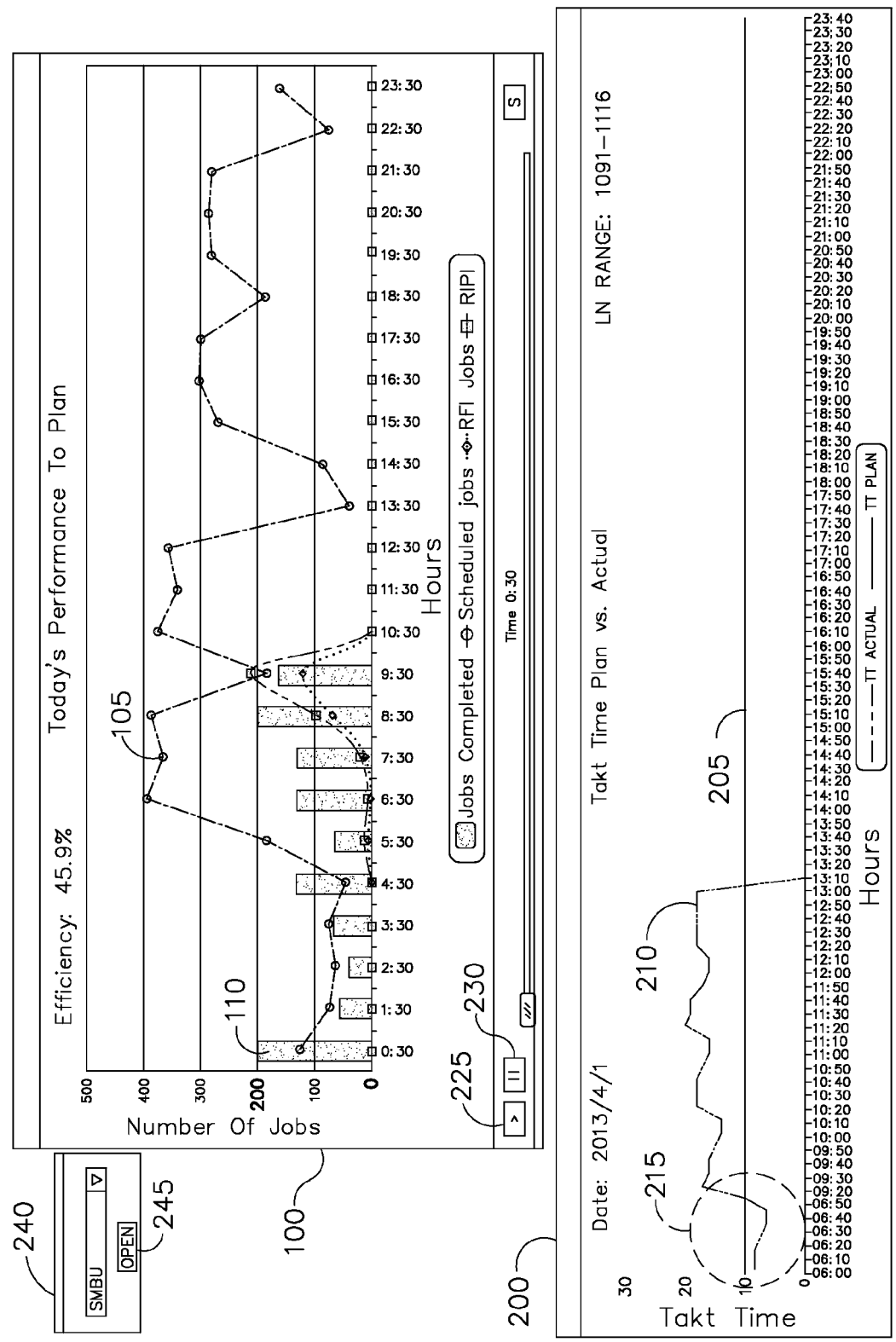
FIG. 2 is a schematic illustration of a visual display in accordance with aspects of the disclosed embodiment.

FIG. 2 shows additional performance data in the form of another visual display 200 of a user interface providing an exemplary graphical representation of a predetermined job completion time 205 and an exemplary graphical representation of a measured job completion time 210 over a range of units of measure. In at least one exemplary aspect, the units of measure may be increments of time similar to other aspects described herein. In another exemplary aspect, the predetermined job completion time and measured job completion time may be planned takt time and actual takt time, respectively. FIG. 2 also shows a panel 240 having a link 245 to one or more visual displays, information panels as described below, pass fail monitors as described below, or performance data for one or more production operations or processes at a lower level within the production system.

While visual displays 100 and 200 are shown at the same time in FIG. 2, it should be understood that the visual displays may also be shown individually or in combination with any other displays or information.

In at least one aspect, takt time is defined as a production rate based on an amount of work time available during a time period divided by a number of jobs required to be produced during the same time period, typically illustrated by the formula:

$$T = Ta/Td,$$

where:
Ta=the net available time available for work during the time period, also referred to as applied work—the work time per period; and
Td=the units required to be produced per time period. When the time period is a day, Td is typically referred to as the daily demand.

Takt time provides an indicator of balance between related work measure attributes in the production system. For example, in FIG. 2, the number of completed jobs represented by bar graph 110 exceeds the number of scheduled jobs represented by line graph 105 at time period 0:30. This is reflected in the measured job completion time, or actual takt time 210, falling below the predetermined job completion time, or planned takt time 205, for the same time period.

An exemplary method for expressing the predetermined job completion time, or planned takt time, in seconds, is as follows:

$$\text{Takt Time } T = Ta/Td$$

$$T = (Ts \times S)/Td$$

$$T = ((Tn \times 60) \times S)/Td$$

$$T = ((Tm - (Tb + TL + Tx) \times 60) \times S)/Td$$

$$T = ((Sh \times 60) - ((Tb + TL + Tx) \times 60) \times S)/Td$$

$$T = ((8.5 \times 60) - (20 + 30 + 45)) \times 60) \times 2)/4241 = 12$$

Where:
Sh=Number of total hours in a shift
Tm=Total minutes in a shift, Sh*60
Tb=Total break time in minutes
TL=Total lunch time in minutes
Tx=Total time off the product
Tn=Net time available to work in minutes, Tm−(Tb+TL+Tx)
Ts=Net time available to work in seconds, Tn*60
S=Number of balanced shifts
Ta=Net time available multiplied by the number of balanced shifts, Ts*S
Td=Daily Demand[a]

FIG. 3 shows an exemplary display 300 that may be used to enter parameters for calculating planned takt time and for displaying a computed result using, for example, the method above. Areas on the display 300 may be provided for entering a number of shifts 305, hours per shift 310, and an amount of time allocated for breaks 315, lunch 320, and time not on production 325. The production system may then calculate and display the resulting planned takt time. In this example, the resulting planned takt time is expressed in seconds. Referring to FIG. 3, an available time per shift 330 is calculated from the hours per shift and expressed in minutes. The amount of time allocated for breaks 315, lunch 320, and time not on production 325 is subtracted from the available time per shift 330 resulting in a net available time shown in minutes 335 and in seconds 340. In this example, the net available time in seconds is multiplied by the number of shifts 305 and shown in area 345. This example of display 300 shows a full daily demand 350, that is, a number of jobs to be completed over three shifts. In some aspects, only two shifts may be available for work, in particular when a third shift may be used for restaging or replenishing a production operation. In this exemplary display, a daily demand 355 is shown as a number of jobs to be completed over two shifts. The net available time in seconds multiplied by the number of shifts 360 is divided by the daily demand 365 resulting in the planned takt time 370 expressed in seconds. In this example, the resulting takt time is 11 seconds. Thus, if the work measure attributes of the production system are balanced, a job should be completed every 11 seconds of the first two shifts.

One aspect of using takt time includes identifying and defining the units for daily demand. The units may be specific to a particular production system, operation, or process. For example, a sandwich shop might define their daily demand in terms of a number of sandwiches produced per day, while a steel company might define daily demand in terms of a number of pounds of steel produced per day. In at least one aspect of the disclosed embodiment, a methodology might be used to determine the units to be used for daily demand for the particular production system, operation, or process.

Figure 4:
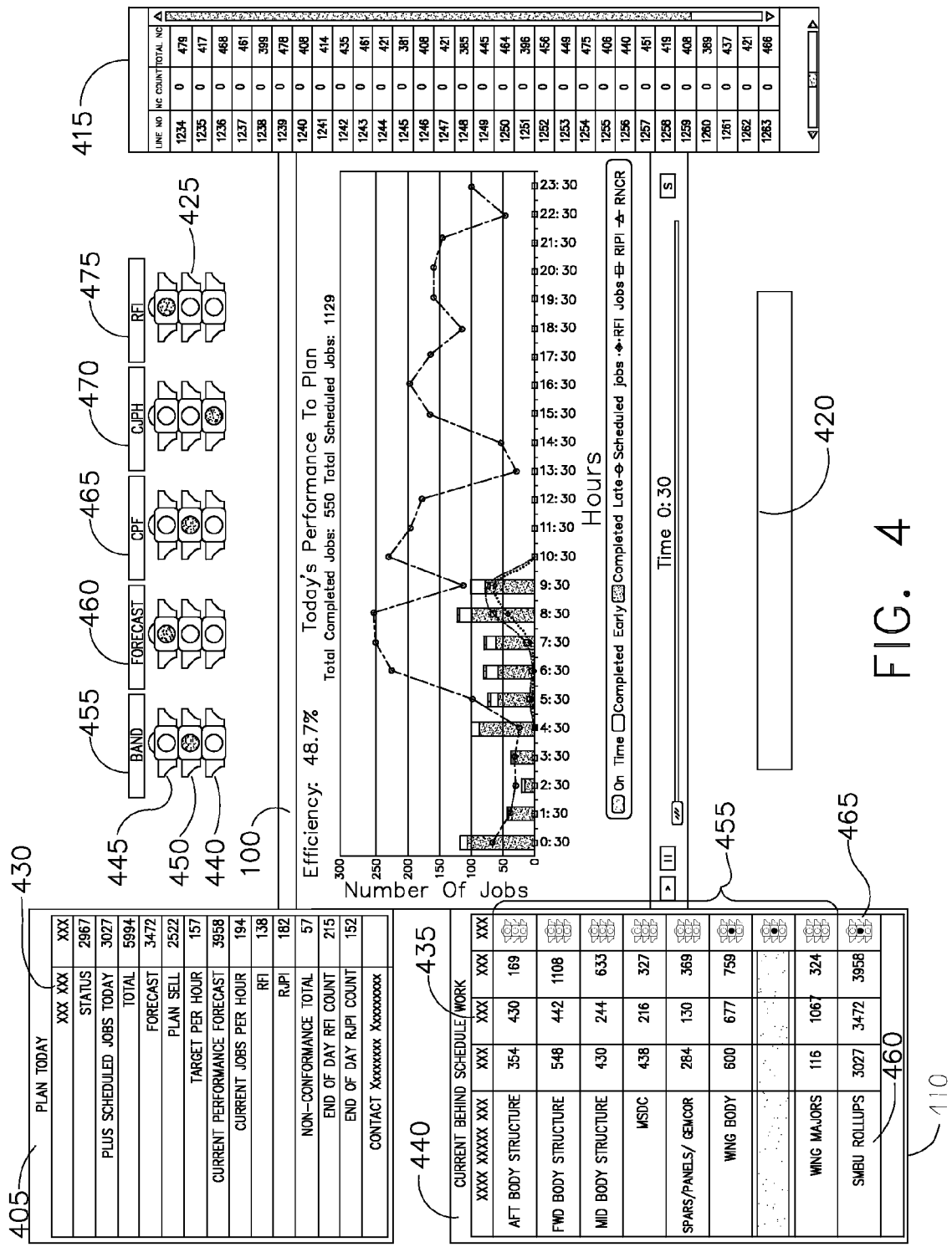
FIG. 4 is a schematic illustration of a visual display in accordance with aspects of the disclosed embodiment.

In another aspect of the disclosed embodiment, performance data may be provided for the production system in the form of one or more panels 405, 410, 415, 420 of alphanumeric performance data related to the production system, as shown in FIG. 4. Each of the panels 405, 410, 415, 420 may be displayed concurrently with visual display 100 or visual display 200 (FIG. 2), may be displayed individually, or may be displayed in any combination of panels and visual displays. The panels 405, 410, 415, 420 may include different groups of alphanumeric performance data. For example, a first panel 405 may show performance statistics including a plan for a particular day 430, further including one or more of a status of a number of jobs, a number of scheduled jobs for a day, a forecast of a number of jobs for a current day, a target number of jobs per hour, a current performance forecast, or current jobs per hour. The first panel 405 may also show a number of plan sell jobs, also referred to as scheduled jobs for a time period. The first panel 405 may further show one or more of a count of current requests for inspection, a count of current requests for in-process inspection, a current count of non-conforming jobs, an end of day count of requests for inspection, or an end of day count of requests for in-process inspection. It should be understood that the list of performance statistics is non-limiting and that any alphanumeric performance data may be shown.

An exemplary second panel 410 may show performance data in the form of performance statistics of different production operations or processes of the production system, for example, a current work behind schedule table 435, including performance statistics of programs, business units, shops, or crews within the production system. The performance statistics related to the current work behind schedule table may include jobs due, jobs forecast, and performance versus a currently planned forecast. Panel 410 may show performance statistics for any production operation or process individually or for any production operations or processes together.

An exemplary third panel 415 may provide additional alphanumeric performance data, for example, a count of non-conformance occurrences for a time period, for example an hour, and a total count of non-conformance occurrences for another time period, for example a day, for each production operation or process. It should be understood that the alphanumeric performance data shown in panel 415 is not limited to non-conformance data and any suitable alphanumeric performance data may be shown.

One or more alphanumeric notifications may be provided in panel 420. In one exemplary aspect, panel 420 may provide alphanumeric messages related to any of the production operations or processes. In a further aspect, the messages may appear as a sequential series of characters and may scroll horizontally. In another aspect, the messages may scroll vertically. The messages may be generated automatically by the production system or may be user generated and may provide any information related to the production system. In particular, the notifications may be related to one or more work measure attributes, a variance between trends of related work measure attributes, or a performance statistic exceeding or failing to reach a predetermined threshold. The notifications may also be generated when any characteristic of the production system exceeds or fails to reach a predetermined threshold.

The production system may further supply one or more pass-fail monitors 425 providing a discrete indication of the performance statistics or other performance data of the operation or process shown in visual display 100. The pass fail monitors may provide an indication of performance data shown in visual display 200, panels 405, 410, 415, 420, or any other performance data. In one example, the pass fail monitors may provide an indication of performance data with respect to a pass condition indicating that the performance data is within a first predetermined threshold or band of values, a fail condition indicating that the performance data is outside of a second predetermined threshold or band of values, and an intermediate condition, indicating that the performance data is between the first and second thresholds or bands of values.

Each pass fail monitor 425 may include a first state indicator 440 indicating the pass condition, a second state indicator 445 indicating the fail condition, and one or more intermediate indicators 450 indicating intermediate conditions between the pass and fail conditions. In an aspect of the disclosed embodiment, the pass fail monitors 425 are shown in the form of a traffic signal with the first 440, second 445, and intermediate 450 state indicators having the colors green, red, and yellow, respectively. The state indicators are not limited to having different colors and may provide any visible indication of the pass, fail, or intermediate conditions. The pass fail monitors may be provided in other forms, for example, a go-no go indicator with a first state indicator indicating a pass condition and a second state indicator indicating a fail condition, or any other monitor providing discrete state indicators of a pass condition, a fail condition, and optionally one or more intermediate conditions.

Referring again to FIG. 4, pass fail monitors 425 may be provided to display an exemplary indication of production line health 455, which may be defined as one or more performance characteristics of the operation or process shown in FIG. 4 compared to predetermined thresholds for the one or more characteristics, a real time forecast versus performance 460, performance versus a currently planned forecast for a predetermined time period 465, an indication of current completed jobs per hour 470, or an indicator of current completed requests for inspection 475.

Pass fail monitors may be provided within any of the panels 405, 410, 415. For example, pass fail monitors 465 may be provided in panel 410 to provide an indication of performance data for one or more shops 455 of a business unit and may also include a pass fail monitor 460 for the business unit itself. In at least one aspect, the pass fail monitors 465 may provide a link to one or more visual displays, information panels, or pass fail monitors for the associated shop or business unit.

While FIGS. 1, 2, and 4 show visual displays of exemplary related work measure attributes, alphanumeric performance data, and pass fail monitors for a production system, it should be understood that the visual displays, alphanumeric performance data, pass fail monitors, and any other indicators described herein may be used for operations or processes at any level within the production system. As mentioned above, an exemplary production system may include one or more production operations and one or more production processes providing services or components to the one or more production operations. In at least one exemplary aspect, a production system may include a hierarchy of production operations and processes at different levels including a program level, business unit level, shop level, and a crew level, and may provide visual displays, alphanumeric performance data, pass fail monitors, and other indicators for any operations or processes at any level.

Figure 5:
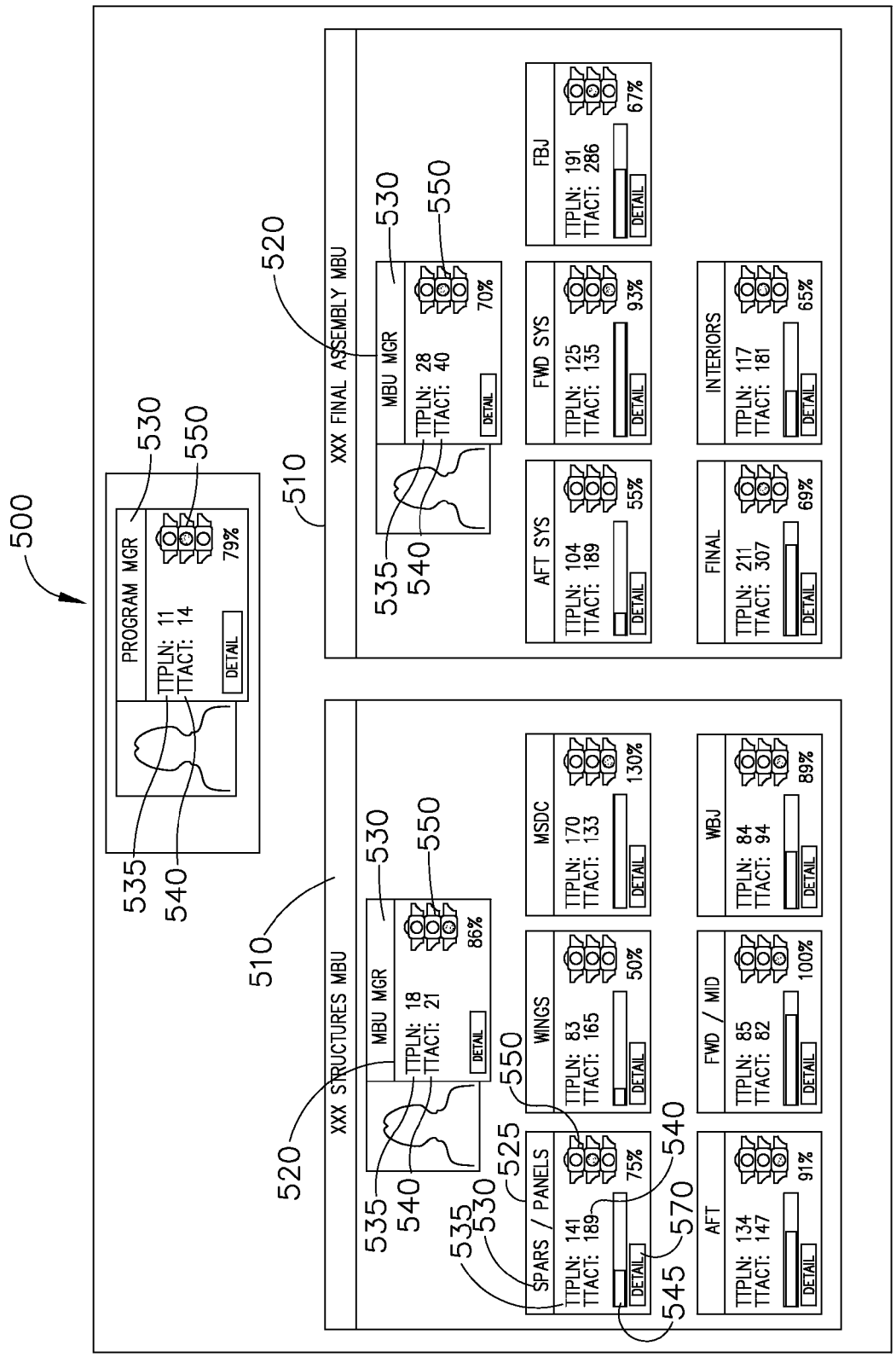
FIG. 5 shows an exemplary hierarchical portrayal of one or more views of a production system in accordance with aspects of the disclosed embodiment.

FIG. 5 shows an exemplary hierarchical portrayal 500 of one or more views of the production system at different levels. The views may include a program view 505, and one or more business unit views 510, 515. For example, each business unit view 510, 515 may include a management level view 520, showing performance data for the business unit as well as one or more shop level views 525 showing performance data for each shop. While the exemplary hierarchical portrayal 500 is shown as having three levels with program, business unit management, and shop level views, it should be understood that the hierarchical portrayal 500 may include any number of levels and any number of views at each level.

Each exemplary view 505, 510, 515, 520, 525 may show an identification of the view 530, and performance data for the production operation or process represented by the view. In this example, the performance data includes a predetermined job completion time, or planned takt time 535 for the operation or process portrayed by the view, and a measured job completion time, or actual takt time 540 for the operation or process portrayed by the view. Each exemplary view 505,

510, 515, 520, 525 may also show a metric 545 indicating a measured variance between the predetermined and measured job completion times for a time range. In this example, the measured variance is expressed as a percentage of planned takt time divided by actual takt time, however, it should be understood that each view may include any measure of suitable performance data.

Each exemplary view 505, 510, 515, 520, 525 may include a pass-fail monitor 550 providing an indication of the performance data for the associated production operation or process. In this example the performance data shown is planned takt time divided by actual takt time expressed as a percentage. The pass condition indicator 555 indicates that the percentage is within a first predetermined threshold or band of values, the fail condition indicator 560 indicates that the performance data is outside of a second predetermined threshold or band of values, and the intermediate condition indicator 565 indicates that the performance data is between the first and second thresholds. The pass, fail and intermediate condition indicators are not limited to indicating the percentage of planned takt time divided by actual takt time, but may be used to provide an indication of any performance data related to the associated production operation or process.

Referring again to FIG. 5, at least one of the views comprises a link 570 to a combination of visual displays, information panels, or pass fail monitors for the associated program, shop or business unit.

FIG. 6 shows an exemplary computer system 600 for practicing aspects of the disclosed embodiment. The computer system includes at least one processor 605, a non-transitory computer readable medium 610 including computer program code instructions 615, and a user interface 620. In at least one aspect, the non-transitory computer readable medium 610 may be implemented as a memory. In alternate aspects the computer readable medium 610 may be remote from the processor 605 or the user interface 620. In another aspect, the computer program code instructions 615 of the non-transitory computer readable medium 610 provide instructions for implementing the disclosed embodiment.

Computer system 600 may be linked to another computer system 625 over a communication system 630 such that computer systems 600 and 625 are capable of exchanging information with each other to implement the disclosed embodiment.

The communication system 630 may include a communications network, for example the Internet. In other aspects of the disclosed embodiment, the communication system may be any communication system including by way of example, dedicated communication lines, fiber optic lines, satellite communication systems, telephone networks, and wireless data transmission systems, two-way cable systems, customized computer networks, hot spots, personal communication systems, and the like.

Computer system 625 may also include a processor 635, a non-transitory computer readable medium 640 including computer program code instructions 645, and a user interface 650. The non-transitory computer readable medium 610, 640 may include magnetic media, optical media, or any other suitable device or mechanism for storing or providing computer program code instructions. Each user interface 620, 650 may include one or more input devices 655, 660 for supplying commands and data to the computer systems and may be distributed throughout the production system. For example, the input devices 620, 650 may collect production data from one or more production operations or processes at any of the program level, business unit level, shop level or crew level. The input devices 620, 650 may be used to collect data related to for any production operation or process located anywhere in the production system in order to provide information required for the visual displays of exemplary related work measure attributes, alphanumeric performance data, pass fail monitors, or any other performance indicator or other information related to the production system. Each user interface 620, 650 may also include output devices 665, 670 for providing at least the visual displays 100, 200, 300, panels 405, 410, 415, 420, pass fail monitors 425, 465, 550, hierarchical portrayal 500 and any other information provided by the disclosed embodiment. User interfaces 620, 650 may comprise multiple user interfaces and may be distributed throughout the production system or distributed anywhere information about the production system is to be provided. User interfaces 620, 650 and include any device suitable for showing the performance data provided by the production system, including any fixed, mobile, local, or remote device.

The production system also provides the ability to store performance data for later playback. For example, one or more of the related work measure attributes, variance between trends of the work measure attributes, predetermined job completion time, measured job completion time, the metric indicating a measured variance between the predetermined and measured job completion times, or any other suitable information may be stored in memory 610, 640 and played back on user interface 620, 650. In at least one exemplary aspect, controls 225, 230, 235 as shown in FIG. 2 may be provided for playing back the information. The controls may include a play function 225, a pause function 230, and a slider bar 235 to select a particular time frame for the playback. Other suitable controls may also be provided.

In another exemplary aspect the production system may be configured to generate one or more alerts when a performance measure of the production system has exceeded or failed to reach a particular threshold or performance measure. For example, when the variance between trends of the at least first and second related work measure attributes shown in visual display 100 exceeds a predetermined threshold, an alert may be generated and sent to a set of predetermined user interfaces. As a further example, tables 675, 680 of alert conditions, and associated user interfaces to be notified, may be provided within one or more of computer readable mediums 610, 640. Upon detecting an alert condition, the associated user interfaces may be provided with messages indicating an alert. Other procedures for generating alerts may also be utilized.

Figure 7:
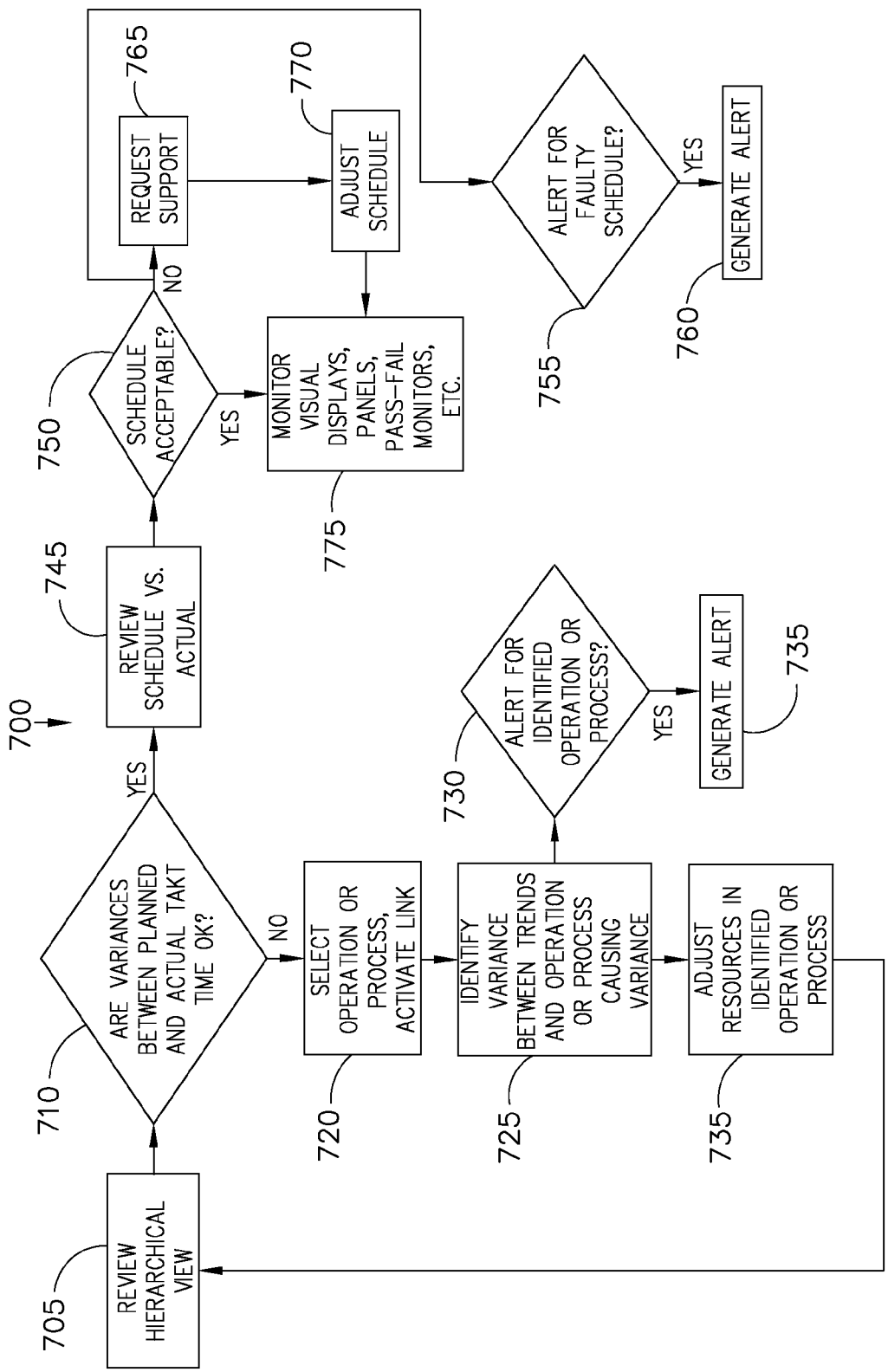
FIG. 7 shows at least one procedure in accordance with aspects of the disclosed embodiment.

FIG. 7 shows at least one procedure 700 for utilizing the aspects of the disclosed embodiment. In bock 705, the hierarchical view 500 (FIG. 5) may be examined. In block 710, the pass-fail monitor 550 or the metric 545 may be examined for the views 505, 510, 515, 520, 525 to determine which operations or processes have a measured variance between planned and actual takt time outside of their predetermined thresholds or band of values. In block 720 an operation or process that is not achieving the predetermined threshold or band of values is selected and the link 570 in the hierarchical view 500 is activated to show a visual display 100, 200 of the selected operation or process. In block 725, a variance between trends of related work measure attributes may be identified that is causing the variance between planned and actual takt time, and the production operations or process causing the variation in trends may be identified. In block 730, it may be determined if an alert is to be generated for at least one of the operations or processes causing the variance, and if so an alert is generated in block 740 identifying the one or more operations or processes causing the variance in trends. In block 735 resources are adjusted in the identified operation or process causing the variance in trends.

In the event that the hierarchical view 500 shows no operations or processes that have a measured variance between planned and actual takt time outside their predetermined thresholds or band of values, other production system performance data may be reviewed, for example a schedule for jobs versus actual job completion performance, as shown in block 745. A determination of whether the job schedule is appropriate as shown in block 750 may be determined by reviewing the visual displays 100, 200, panels 405, 410, 415, 420, pass-fail monitors 425, or other performance data for the production system. If the schedule is faulty, it may be determined if an alert is to be generated in block 755 and if so an alert is generated in block 760. In addition, a request may be made as shown in block 765 and the schedule may be adjusted as shown in block 770.

The disclosed embodiment includes a suite of visualization tools that display production system data. In at least one aspect, the production system may be a hierarchical system with various production operations and processes at different levels, for example, program, business unit, shop, and crew levels. The visualization tools may provide performance data for the different production operations at different levels in the hierarchical system, including a hierarchical view of balance indicators for the production system and detail views of each production operation in the production system. Each detail view may include a comparison of planned task completion time to actual task completion time, and may selectively provide work measure attributes of performance indicators of components of the production operation. By analyzing the different performance indicators, production operation components causing variation between the planned task completion time and the actual task completion time may be identified for further investigation. The suite of visualization tools provides insight into key production factors that may be altered to improve production operations, processes, and the overall production system.

In accordance with one or more aspects of the disclosed embodiment, a production system includes a processor, a non-transitory computer readable medium including computer program code instructions, and a user interface, the user interface and the processor, under control of the computer program code configured to visually display at least a first graphical representation of a first work measure attribute and a second graphical representation of a second related work measure attribute for a production operation over a time range, and visually display a variance between trends of the at least first and second graphical representations of the first and second work measure attributes over the time range.

In accordance with one or more aspects of the disclosed embodiment, the user interface and the processor, under control of the computer program code are further configured to visually display a third graphical representation of a predetermined job completion time and a fourth graphical representation of a measured job completion time over the time range, and visually display a metric indicating a measured variance between the predetermined and measured job completion times over the time range.

In accordance with one or more aspects of the disclosed embodiment, the job completion time is takt time.

In accordance with one or more aspects of the disclosed embodiment, the user interface and the processor, under control of the computer program code are further configured to concurrently display the variance between trends of the at least first and second related work measure attributes and the metric indicating the measured variance between the predetermined and measured job completion times over the time range.

In accordance with one or more aspects of the disclosed embodiment, the user interface and the processor, under control of the computer program code are further configured to visually display a hierarchical portrayal of one or more views, each view representing one of the production operations and comprising the metric indicating the measured variance between the predetermined and measured job completion times over the time range for the represented production operation.

In accordance with one or more aspects of the disclosed embodiment, at least one of the views comprises a link to a data display for a production process of the represented production operation.

In accordance with one or more aspects of the disclosed embodiment, the at least first and second related work measure attributes comprise jobs completed and in process requests for inspection, respectively.

In accordance with one or more aspects of the disclosed embodiment, the user interface and the processor, under control of the computer program code are further configured to display panels of alphanumeric performance data related to the production system.

In accordance with one or more aspects of the disclosed embodiment, the alphanumeric performance data includes one or more of a status of a number of jobs, a number of scheduled jobs for a day, a forecast of a number of jobs for a current day, a number of plan sell jobs, a target number of jobs per hour, a current performance forecast, or current jobs per hour.

In accordance with one or more aspects of the disclosed embodiment, the alphanumeric performance data includes one or more of a count of current requests for inspection, a count of current requests for in-process inspection, a current count of non-conforming jobs, an end of day count of requests for inspection, or an end of day count of requests for in-process inspection.

In accordance with one or more aspects of the disclosed embodiment, the user interface and the processor, under control of the computer program code are further configured to visually display at least one pass-fail monitor comprising a first state indicator indicating a pass condition, a second state indicator indicating a fail condition, and one or more intermediate indicators indicating intermediate conditions between the pass and fail conditions.

In accordance with one or more aspects of the disclosed embodiment, the at least one pass fail monitor provides an indication of one or more of production line health, a real time forecast versus performance, performance versus a currently planned forecast for a predetermined time period, an indication of current completed jobs per hour, or an indication of current completed requests for inspection.

In accordance with one or more aspects of the disclosed embodiment, the user interface and the processor, under control of the computer program code are further configured to store the at least first and second work measure attributes and the variance between trends of the at least first and second work measure attributes over the time range, and redisplay the stored at least first and second work measure attributes and the variance between trends of the at least first and second work measure attributes over at least a portion of the time range for analysis.

In accordance with one or more aspects of the disclosed embodiment, the user interface and the processor, under control of the computer program code are further configured to generate an alert when the variance between trends of the at least first and second related work measure attributes exceeds a predetermined threshold.

In accordance with one or more aspects of the disclosed embodiment, a production system includes a processor, a non-transitory computer readable medium including computer program code instructions, and a user interface, the user interface and the processor, under control of the computer program code configured to concurrently provide a visual display of at least a first graphical representation of a first work measure attribute and a second graphical representation of a second related work measure attribute and a visual display of a variance between trends of the at least first and second graphical representations of the first and second work measure attributes over a time range for a production operation, in a first portion of the user interface, and concurrently provide a visual display of a third graphical representation of a predetermined job completion time and a fourth graphical representation of a measured job completion time and a visual display of a metric indicating a measured variance between the predetermined distribution and measured job completion times over the time range, in a second portion of the user interface.

In accordance with one or more aspects of the disclosed embodiment, the job completion time is takt time.

In accordance with one or more aspects of the disclosed embodiment, the user interface and the processor, under control of the computer program code are further configured to visually display a hierarchical portrayal of one or more views, each view representing one of the production operations and comprising the metric indicating the measured variance between the predetermined and measured job completion times over the time range for the represented production operation.

In accordance with one or more aspects of the disclosed embodiment, at least one of the visually displayed production operations comprise a link to a data display for a production process of the represented production operation.

In accordance with one or more aspects of the disclosed embodiment, the at least first and second related work measure attributes comprise jobs completed and in process requests for inspection, respectively.

In accordance with one or more aspects of the disclosed embodiment, the user interface and the processor, under control of the computer program code are further configured to display panels of alphanumeric performance data related to the production system.

In accordance with one or more aspects of the disclosed embodiment, the alphanumeric performance data includes one or more of a status of a number of jobs, a number of scheduled jobs for a day, a forecast of a number of jobs for a current day, a number of plan sell jobs, a target number of jobs per hour, a current performance forecast, or current jobs per hour.

In accordance with one or more aspects of the disclosed embodiment, the alphanumeric performance data includes one or more of a count of current requests for inspection, a count of current requests for in-process inspection, a current count of non-conforming jobs, an end of day count of requests for inspection, or an end of day count of requests for in-process inspection.

In accordance with one or more aspects of the disclosed embodiment, the user interface and the processor, under control of the computer program code are further configured to visually display at least one pass-fail monitor comprising a first state indicator indicating a pass condition, a second state indicator indicating a fail condition, and one or more intermediate indicators indicating intermediate conditions between the pass and fail conditions.

In accordance with one or more aspects of the disclosed embodiment, the at least one pass fail monitor provides an indication of one or more of production line health, a real time forecast versus performance, performance versus a currently planned forecast for a predetermined time period, an indication of current completed jobs per hour, or an indication of current completed requests for inspection.

In accordance with one or more aspects of the disclosed embodiment, the user interface and the processor, under control of the computer program code are further configured to store the at least first and second work measure attributes and the variance between trends of the at least first and second work measure attributes over the time range, and redisplay the stored at least first and second work measure attributes and the variance between trends of the at least first and second work measure attributes over at least a portion of the time range for analysis.

In accordance with one or more aspects of the disclosed embodiment, the user interface and the processor, under control of the computer program code are further configured to generate an alert when the variance between trends of the at least first and second related work measure attributes exceeds a predetermined threshold.

In accordance with one or more aspects of the disclosed embodiment, a method comprises visually displaying on a user interface at least a first graphical representation of a first work measure attribute and a second graphical representation of a second related work measure attribute for a production operation over a time range, and visually displaying on the user interface a variance between trends of the at least first and second graphical representations of the first and second work measure attributes over the time range.

In accordance with one or more aspects of the disclosed embodiment, the method includes visually displaying a third graphical representation of a predetermined job completion time and a fourth graphical representation of a measured job completion time over the time range, and visually displaying a metric indicating a measured variance between the predetermined and measured job completion times over the time range.

In accordance with one or more aspects of the disclosed embodiment, the method includes visually displaying a hierarchical portrayal of one or more views, each view representing one of the production operations and comprising the metric indicating the measured variance between the predetermined and measured job completion times over the time range for the represented production operation.

In accordance with one or more aspects of the disclosed embodiment, the method includes providing a link to a data display for a production process of the represented production operation.

In accordance with one or more aspects of the disclosed embodiment, the method includes displaying panels of alphanumeric performance data related to the production system.

In accordance with one or more aspects of the disclosed embodiment, the method includes visually displaying at least one pass-fail monitor comprising a first state indicator indicating a pass condition, a second state indicator indicating a fail condition, and one or more intermediate indicators indicating intermediate conditions between the pass and fail conditions.

In accordance with one or more aspects of the disclosed embodiment, the method includes storing the at least first and second work measure attributes and the variance between trends of the at least first and second work measure attributes over the time range in a memory, and redisplaying the stored at least first and second work measure attributes and the variance between trends of the at least first and second work measure attributes over at least a portion of the time range on the user interface for analysis.

In accordance with one or more aspects of the disclosed embodiment, the method includes generating an alert when the variance between trends of the at least first and second related work measure attributes exceeds a predetermined threshold.

It should be understood that the foregoing description is only illustrative of the aspects of the disclosed embodiment. Various alternatives and modifications can be devised by those skilled in the art without departing from the aspects of the disclosed embodiment. Accordingly, the aspects of the disclosed embodiment are intended to embrace all such alternatives, modifications and variances that fall within the scope of the appended claims. Further, the mere fact that different features are recited in mutually different dependent or independent claims does not indicate that a combination of these features cannot be advantageously used, such a combination remaining within the scope of the aspects of the invention.

What is claimed is:

1. A production system comprising:
a processor;
a non-transitory computer readable medium including computer program code instructions; and
a user interface;
the user interface and the processor, under control of the computer program code are configured to:
visually display at least a first graphical representation of a first real time production line work measure attribute pertaining to a production operation of a production system and a second graphical representation of a second related production line work measure attribute for the production operation of the production system over a time range; and
visually display a variance in real time between real time trends of the at least first and second graphical representations of the first real time production line work measure attribute and the second related production line work measure attribute over the time range, where the variance displayed indicates a difference between planned and actual production line performance and identifies
whether at least one of the first real time production line work attribute and second related production line work measure attribute is a real time contributor to the variance, and
identifies a production operation or production process causing the variance.

2. The production system of claim 1, wherein the user interface and the processor, under control of the computer program code are further configured to:
visually display a third graphical representation of a predetermined job completion time and a fourth graphical representation of a measured job completion time over the time range; and
visually display a metric indicating a measured variance between the predetermined and measured job completion times over the time range.

3. The production system of claim 2, wherein the job completion time is takt time.

4. The production system of claim 2, wherein the user interface and the processor, under control of the computer program code are further configured to concurrently display the variance between real time trends of the at least first real time production line work measure attribute and second related production line work measure attribute and the metric indicating the measured variance between the predetermined and measured job completion times over the time range.

5. The production system of claim 2, wherein the user interface and the processor, under control of the computer program code are further configured to visually display a hierarchical portrayal of one or more views, each view representing one of the production operations and comprising the metric indicating the measured variance between the predetermined and measured job completion times over the time range for the represented production operation.

6. The production system of claim 5, wherein at least one of the views comprises a link to a data display for a production process of the represented production operation.

7. The production system of claim 1, wherein the at least first real time production line work measure attribute and second related production line work measure attribute comprise jobs completed and in process requests for inspection, respectively.

8. The production system of claim 1, wherein the user interface and the processor, under control of the computer program code are further configured to display panels of alphanumeric performance data related to the production system.

9. The production system of claim 8, wherein the alphanumeric performance data includes one or more of a status of a number of jobs, a number of scheduled jobs for a day, a forecast of a number of jobs for a current day, a number of plan sell jobs, target number of jobs per hour, a current performance forecast, or current jobs per hour.

10. The production system of claim 8, wherein the alphanumeric performance data includes one or more of a count of current requests for inspection, a count of current requests for in-process inspection, a current count of non-conforming jobs, an end of day count of requests for inspection, or an end of day count of requests for in-process inspection.

11. The production system of claim 1, wherein the user interface and the processor, under control of the computer program code are further configured to visually display at least one pass-fail monitor comprising a first state indicator indicating a pass condition, a second state indicator indicating a fail condition, and one or more intermediate indicators indicating intermediate conditions between the pass and fail conditions.

12. The production system of claim 11, wherein the at least one pass fail monitor provides an indication of one or more of production line health, a real time forecast versus performance, performance versus a currently planned forecast for a predetermined time period, an indication of current completed jobs per hour, or an indication of current completed requests for inspection.

13. The production system of claim. 1, wherein the user interface and the processor, under control of the computer program code are further configured to:
store the at least first real time production line work measure attribute and second related production line work measure attribute and the variance between real time trends of the at least first real time production line work measure attribute and the second related production line work measure attribute over the time range; and redisplay the stored at least first real time production line work measure attribute and second production line work measure attribute and the variance between real time trends of the at least first real time production line work measure attribute and the second related production line work measure attribute over at least a portion of the time range for analysis.

14. The production system of claim 1, wherein the user interface and the processor, under control of the computer program code are further configured to generate an alert when the variance between real time trends of the at least first real time production line work measure attribute and second related production line work measure attribute exceeds a predetermined threshold.

15. A production system comprising:
a processor;
a non-transitory computer readable medium including computer program code instructions; and
a user interface;
the user interface and the processor, under control of the computer program code configured to:
concurrently provide a visual display of at least a first graphical representation of a first real time production line work measure attribute pertaining to a production operation of a production system and a second graphical representation of a second related production line work measure attribute for the production operation of the production system and a visual display of a variance in real time between real time trends of the at least first and second graphical representations of the first real time production line work measure attribute and the second related production line work measure attribute over a time range for a production operation, in a first portion of the user interface, where the variance displayed indicates a different between planned and actual production line performance and identifies whether at least one of the first real time production line work measure attribute and the second related production line work measure attribute is a real time contributor to the variance and identifies a production operation or production process causing the variance; and
concurrently provide a visual display of a third graphical representation of a predetermined job completion time and a fourth graphical representation of a measured job completion time and a visual display of a metric indicating a measured variance between the predetermined distribution and measured job completion times over the time range, in a second portion of the user interface.

16. The production system of claim 15, wherein the job completion time is takt time.

17. The production system of claim 15, wherein the user interface and the processor, under control of the computer program code are further configured to visually display a hierarchical portrayal of one or more views, each view representing one of the production operations and comprising the metric indicating the measured variance between the predetermined and measured job completion times over the time range for the represented production operation.

18. The production system of claim 17, wherein at least one of the visually displayed production operations comprise a link to a data display for a production process of the represented production operation.

19. The production system of claim 15, wherein the at least first real time production line work measure attribute and second related production line work measure attribute comprise jobs completed and in process requests for inspection, respectively.

20. The production system of claim 15, wherein the user interface and the processor, under control of the computer program code are further configured to display panels of alphanumeric performance data related to the production system.

21. The production system of claim 20, wherein the alphanumeric performance data includes one or more of a status of a number of jobs, a number of scheduled jobs for a day, a forecast of a number of jobs for a current day, a number of plan sell jobs, a target number of jobs per hour, a current performance forecast, or current jobs per hour.

22. The production system of claim 20, wherein the alphanumeric performance data includes one or more of a count of current requests for inspection, a count of current requests for in-process inspection, a current count of non-conforming jobs, an end of day count of requests for inspection, or an end of day count of requests for in-process inspection.

23. The production system of claim 15, wherein the user interface and the processor, under control of the computer program code are further configured to visually display at least one pass-fail monitor comprising a first state indicator indicating a pass condition, a second state indicator indicating a fail condition, and one or more intermediate indicators indicating intermediate conditions between the pass and fail conditions.

24. The production system of claim 23, wherein the at least one pass fail monitor provides an indication of one or more of production line health, a real time forecast versus performance, performance versus a currently planned forecast for a predetermined time period, an indication of current completed jobs per hour, or an indication of current completed requests for inspection.

25. The production system of claim 15, wherein the user interface and the processor, under control of the computer program code are further configured to:
store the at least first real time production line work measure attribute and the second related production line work measure attribute and the variance between real time trends of the at least first real time production line work measure attribute and second related production line work measure attribute over the time range; and
redisplay the stored at least first real time production line work measure attribute and second related production line work measure attribute and the variance between real time trends of the at least first real time production line work measure attribute and second related production line work measure attribute over at least a portion of the time range for analysis.

26. The production system of claim 15, wherein the user interface and the processor, under control of the computer program code are further configured to generate an alert when the variance between real time trends of the at least first real time production line work measure attribute and second related production line work measure attribute exceeds a predetermined threshold.

27. A method comprising:
visually displaying on a user interface at least a first graphical representation of a first real time production line work measure attribute pertaining to a production operation of a production system and a second graphical representation of a second related production line work measure attribute for the production operation of the production system over a time range; and visually displaying on the user interface a variance in real time between real time trends of the at least first and second graphical representations of the first and second production line work measure attributes over the time range, where the variance displayed indicates a difference between planned and actual production line performance and identifies whether at least one of the first and second production line work measure attributes is a real time contributor to the variance and identifies a production operation or production process causing the variance.

28. The method of claim 27, comprising:

visually displaying a third graphical representation of a predetermined job completion time and a fourth graphical representation of a measured job completion time over the time range; and visually displaying a metric indicating a measured variance between the predetermined and measured job completion times over the time range.

29. The method of claim 28, comprising visually displaying a hierarchical portrayal of one or more views, each view representing one of the production operations and comprising the metric indicating the measured variance between the predetermined and measured job completion times over the time range for the represented production operation.

30. The method of claim 29, comprising providing a link to a data display for a production process of the represented production operation.

31. The method of claim 27, comprising displaying panels of alphanumeric performance data related to the production system.

32. The method of claim 27, comprising visually displaying at least one pass-fail monitor comprising a first state indicator indicating a pass condition, a second state indicator indicating a fail condition, and one or more intermediate indicators indicating intermediate conditions between the pass and fail conditions.

33. The method of claim 27, comprising:

storing the at least first real time production line work measure attribute and second related production line work measure attribute and the variance between real time trends of the at least first real time production line work measure attribute and second related production line work measure attribute over the time range in a memory; and redisplaying the stored at least first real time production line work measure attribute and second related production line work measure attribute and the variance between real time trends of the at least first real time production line work measure attribute and second related production line work measure attribute over at least a portion of the time range on the user interface for analysis.

34. The method of claim 27, comprising generating an alert when the variance between real time trends of the at least first real time production line work measure attribute and second related production line work measure attribute exceeds a predetermined threshold.

* * * * *